June 3, 1969     L. F. PEYSER     3,448,270
X-RAY COLLIMATING DEVICE WHEREIN A PLURALITY OF ADJUSTABLE
OVERLAPPING LEAVES DEFINE A COLLIMATING CONE
Filed Nov. 23, 1966     Sheet 4 of 5

INVENTOR
LEONARD F. PEYSER
BY
AGENT

INVENTOR
LEONARD F. PEYSER
BY
AGENT

United States Patent Office 3,448,270
Patented June 3, 1969

3,448,270
X-RAY COLLIMATING DEVICE WHEREIN A PLURALITY OF ADJUSTABLE OVERLAPPING LEAVES DEFINE A COLLIMATING CONE
Leonard F. Peyser, Briarcliff Manor, N.Y., assignor to The Machlett Laboratories, Incorporated, Springdale, Conn., a corporation of Connecticut
Filed Nov. 23, 1966, Ser. No. 596,491
Int. Cl. H01j 1/52
U.S. Cl. 250—105
11 Claims

ABSTRACT OF THE DISCLOSURE

A collimator for X-ray devices which embodies three separate shutter systems one of which is shaped to extend within the port close to the window of an X-ray tube or housing for interception of undesired off-focus radiation, a second thereof being comprised of a number of pivotally movable shutter elements ararnged in a pyramidal fashion for controlling the cross-sectional size of a beam of X-radiation and consequently the size of an area of an object being irradiated, and the third thereof being movable plates disposed between the first and second shutters for defining other cross-sectional dimensional aspects of the beam of X-radiation.

Background of the invention

In the manufacture and use of X-ray systems, particularly for diagnosis and treatment of the human body, it is desirable to provide a beam of X-radiation which impinges upon a subject or object only in a desired specific location. It is further desirable that the beam of X-radiation be rigidly confined to the specified area and prevented from contacting other areas and possibly causing damage thereto by undesirable irradiation. Undesirable X-radiation is known to be emitted by X-ray tubes from off-focal spots on the X-ray tube anode. Such off-focus radiation often passes through inefficient shutter devices and sometimes by-passes lead or other absorbent filters and eventually is enabled to reach the subject. The problem of preventing undesired off-focus or other radiation emitted by an X-ray tube anode from passing through a system to a subject is best prevented by disposing X-ray absorbing shutters as close as possible to the X-ray tube anode, and by closely regulating the cross-sectional dimension of the effective useful beam of X-radiation.

Since X-ray tubes for diagnostic and treatment purposes are usually mounted in an oil-filled housing, it has been necessary to provide these housings with windows which are recessed within ports so as to lie relatively close to the X-ray tube insert, envelope or bulb as closely as possible to the X-ray generating anode. Shuttering of off-focus radiation has been attempted in the past by the provision of X-ray absorbing shutter elements adjacent the window. However, in most cases it has been very difficult to position the shutter elements close enough to the windows to be effective because of the necessity of including means for moving the shutters so as to control the size of the emitted beam. Some housings have been provided with lead-absorbing liners or filters encircling the ports for this purpose. However, this adds materially to the construction costs of fabricating the housings and has not proved to be entirely satisfactory since often off-focus radiation is still enabled to pass through the window in the housing.

Summary of the invention

The present invention is directed to a collimating device which is provided with a first shutter system comprised of an arrangement of shutter elements in the form of a multi-sided pyramid or cone, the small end of which extends into the port and terminates closely adjacent the tube window. The shutter elements are adjustable and are pivotally mounted at the ends corresponding to the larger end of the cone or pyramid and upon adjustment are moved into an overlying relation with each other so as to regulate the aperture defined by the ends of the shutter elements at the smaller end of the cone. In accordance with this invention, a larger pyramid or cone of shutter elements is disposed at the opposite end of the collimating device and comprises a plurality of similar but larger shutter elements pivoted at their ends corresponding to the larger end of the cone and adjustable into and out of overlying relation with one another so as to regulate the cross-sectional size of a beam of X-radiation at the aperture defined by the ends of the shutter elements at the smaller end of the cone. Further regulation or control of the shape and size of the beam of X-radiation is obtained by a pair of movable plate-like shutter elements interposed between the two pyramidal shutter systems. All of the shutter elements are arranged and adapted to be manually controlled by a pair of operating handles disposed exteriorly of the collimator housing. The invention comprises, still further, an optical system for projecting light upon the area of the subject to be X-rayed, which lighted area corresponds in area to the cross-sectional size of the beam of X-rays at the surface being irradiated as regulated by the size of the apertures described above. The manual controls exteriorly of the collimator housing also contain switch devices for controlling the source of illumination.

Description of the preferred embodiment

Figure 1:
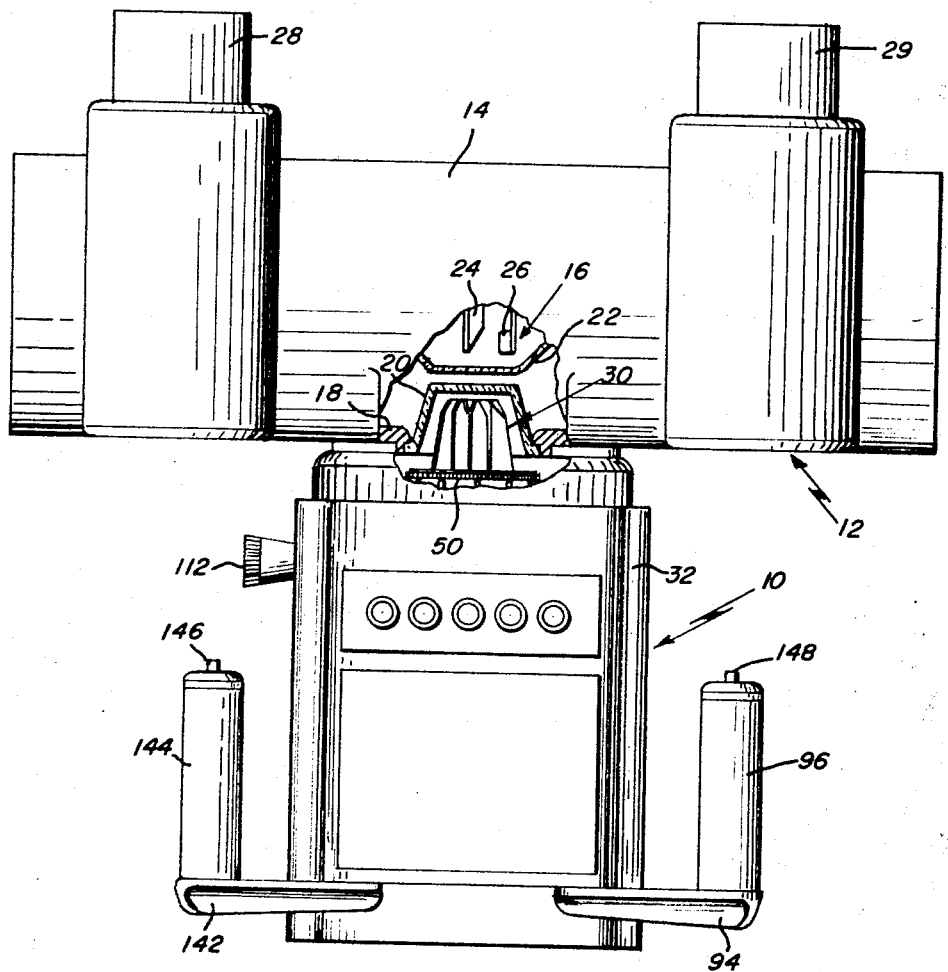
FIG. 1 is a front elevational view, partly in axial section, of X-ray apparatus embodying a preferred form of the invention.

Referring more particularly to the drawings, wherein like characters of reference designate like parts throughout the several views, there is shown in FIG. 1 a collimator device 10 embodying a preferred form of the invention which is mounted in position upon an X-ray tube device 12. The X-ray device 12 includes a hollow cylindrical housing 14 containing an X-ray tube or generator 16 therein, the housing 14 being normally filled with oil or other coolant (not shown) for the purpose of maintaining the interior of the housing and the tube or insert 16 at sufficiently low operating temperature. A port 18 is provided in one wall of the housing 14 and contains therein a recessed window 20 of X-ray transparent material. The window 20 is cup-shaped and extends into the interior of the housing into close proximity with the X-ray tube insert 16, terminating relatively close to the tube envelope 22 adjacent the X-ray emitting portion of an anode 24 within the insert 16. Adjacent the anode 24 is an electron emitting cathode 26. Electrical potentials are supplied to the anode and cathode through internal leads (not shown) which are connected to cable terminals 28 and 29 extending from the housing 14, as is well known in such devices. Additional details of the conventional X-ray generating device 12 are believed to be unnecessary.

In the operation of the device, electrons emitted by the cathode 26 are directed upon an inclined surface of the anode 24, which anode may be of the rotating type to reduce localization of heat by electron bombardment. The electrons from the cathode 26 are focussed in a conventional manner onto a relatively small focal spot on the anode 24, which focal spot generates X-rays which pass off the surface of the anode in substantially all directions. The useful X-rays pass from the focal spot on the anode through the X-ray transparent bulb or envelope 22 and through the window 24 exteriorly of the X-ray device 12.

It will be apparent that a substantial amount of X-rays will impinge upon the inner walls of the housing 14 and, therefore, in many cases the walls are lined with lead or other material which absorbs such unuseful X-radiation. In the operation of a device of this type, the useful beam will be directed from the focal spot out through the window 20. However, it has been found that a small amount of off-focus radiation exists. This off-focus radiation is undesirable and should not be allowed to escape from the tube since it does not contribute to the efficient operation of the device. Therefore, in accordance with the present invention, means is provided for preventing such off-focus radiation from passing exteriorly of the device. This means takes the form of a pyramidal or frusto-conical shutter 30 which is mounted within the upper end of a housing 32 of the collimator device 10, and extends outwardly from the end of the housing into the recessed window 20 and terminates close to the inner end of the window so as to intercept off-focus radiation as closely as possible to the source thereof. Throughout this description the term "upper" is used to denote the end of the collimator nearest the X-ray device, and the term "lower" is intended to refer to the opposite end of the structure. However, it is to be understood that the described system may be inverted for specific uses, such as in "undertable" apparatus, in which case the end of the collimator nearest the X-ray device obviously becomes the "lower" end and the opposite end becomes the "upper" end regardless of the usage of these terms herein.

The housing 32 is mounted upon the X-ray tube housing 14 by any suitable means whereby an opening in the adjacent end thereof is axially aligned with the port 18 and window 20. As will be seen more clearly in FIGS. 2 and 3, the shutter device 30 comprises a number of shutter elements or leaves 34 which are arranged to extend longitudinally of the axis of the device 10 in a substantially pyramidal or frusto-conical arrangement as shown, the small end of the pyramid being disposed exteriorly of the housing 32 and the larger end being located within the housing 32. The leaves 34 are formed as substantially flat elongated plate-like elements the planes of which are disposed at a slight angle with respect to the longitudinal axes of the device so that the leaves 34 slightly overlap one another. The ends of the elements at the large end of the pyramid carry angled outwardly extending lugs 36 (FIG. 9) which are pivotally mounted at their extreme lower ends on U-shaped wire members 38. The ends of the lugs are attached in a pivotal manner to one arm of the U-shaped members while the other arm of each U-shaped member is fixed to a portion of the lug at a point nearer the small end of the pyramid. A transversely extending centrally apertured supporting plate 40 is located below and spaced slightly from the large end of the shutter 30 and carries a number of upwardly projecting bosses or flanges 42 (FIG. 9) which extend on opposite sides of each of the respective lugs 36 and provide a fixed structure upon which the shutter elements 34 are mounted. The U-shaped elements 38 are also supported by the bosses 42 and thus permit pivotal action of the shutter elements as described. In order to effect adjustment of the shutter elements 34 into greater or lesser overlying relation with each other, an annular plate 44 is disposed upon supporting plate 40 and is arranged to rotate about the axis of the device. Annular plate 44 is provided with an upwardly extending rim or flange 46 throughout the periphery of the inner edge thereof, and flange 46 has a number of inwardly struck arms 48 thereon which are adapted to interfit behind the bight portions of respective U-shaped elements 38. Thus, referring particularly to FIG. 3, upon clock-wise rotation of plate 44, the arms 48 are adapted to engage with respective U-shaped elements 38 to forcibly move the elements whereby they will be made to pivot about their connections with the bosses 42 and thereby move the respective lugs 36 and shutter elements 34 in a manner which will cause the upper ends of the elements to move toward and away from one another. This causes the opening or aperture at the upper end of the shutter device 30 to become enlarged or made smaller as is desired. The lugs 36 are also provided with recesses 52 at their upper ends which are intended to receive an annular cooled tension spring 50 which tends to urge the shutter into closed position, the rotational movement of the annular plate 44 thus being accomplished against the normal tension exerted by the spring 50.

Figure 3:
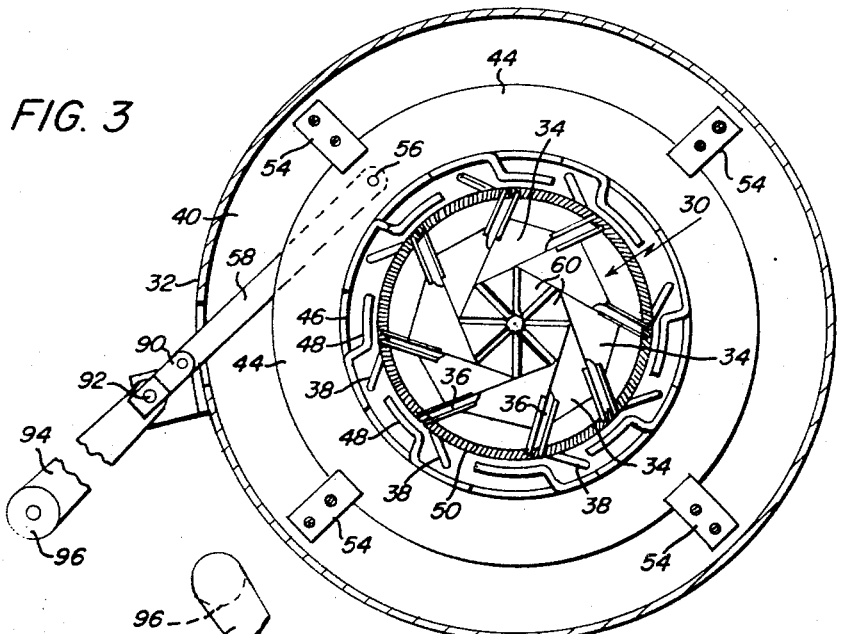
FIG. 3 is a top plane view of the collimator of FIG. 2 with the upper end of the casing removed.
Figure 9:
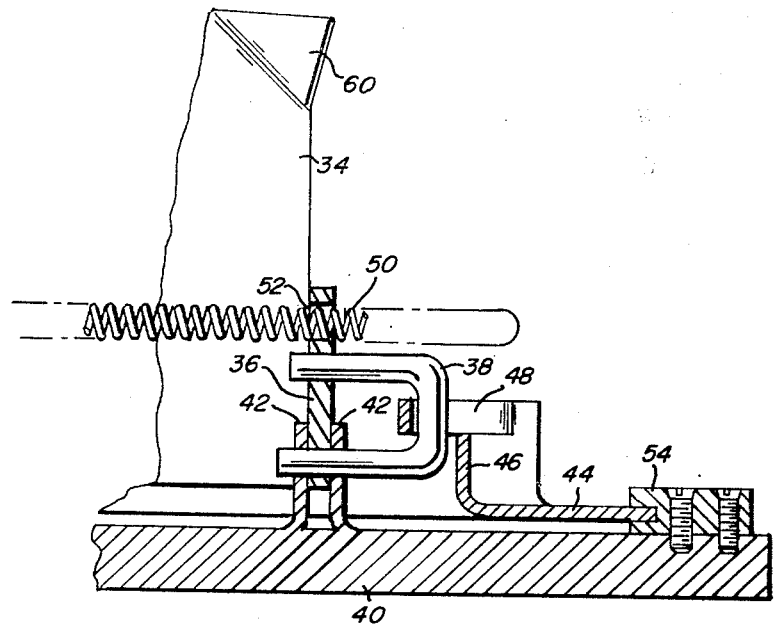
FIG. 9 is an enlarged elevational view of a shutter element of the upper shutter device and its cooperating operating parts.

To effect such adjustment of the opening in the shutter 30, annular flanged plate 44 is retained on the surface of supporting plate 40 by four spaced retainers 54, as shown best in FIGS. 3 and 9, the retainers 54 being provided with grooves or slots for receiving the outer peripheral edge of the annular plate 44 while permitting it to slide therein. Annular plate 44 is provided with a small screw or similar pivot member 56 to which is attached one end of a lever 58. Upon manual manipulation of lever 58 rotary movement of the annular plate 44 upon the surface of supporting plate 40 is accomplished, this in turn effecting adjustment of the aperture in the shutter 30 as desired.

It will be understood that mechanical problems may be encountered which prevent efficient complete closing of the aperture at the small end of the pyramid. In further accordance with this invention, it has been found that the extreme unsupported ends of the shutter elements 34 may be provided with portions 60 which are inwardly inclined at an angle with respect to the plane surface of the respective elements 34. This has been found to provide substantially complete closure of the aperture. The degree of angle of the portions 60 may be selected as desired, a particularly successful angle being 20°.

It will be apparent that by adjustment of the aperture in shutter 30, the cross-sectional size of the useful beam of X-radiation entering the collimator 10 can be controlled and the undesired radiation impinging upon the shutter elements 34 outside the periphery of the aperture will be absorbed. It should be noted that, although the shutter elements 34 may be relatively thin, the impinging radiation does not strike the elements normal to the planes thereof but, rather, at an angle thereto. Since X-rays normally pass through objects substantially undeflected, such oblique contact of the radiation with the shutter elements causes the X-rays to pass through a greater thickness or quantity of the absorbing material. Since the shutter elements 34 are made of lead or other X-ray absorbing material, either in whole or in part, such undesired radiation is efficiently absorbed and thus prevented from passing through the collimator.

Figure 2:
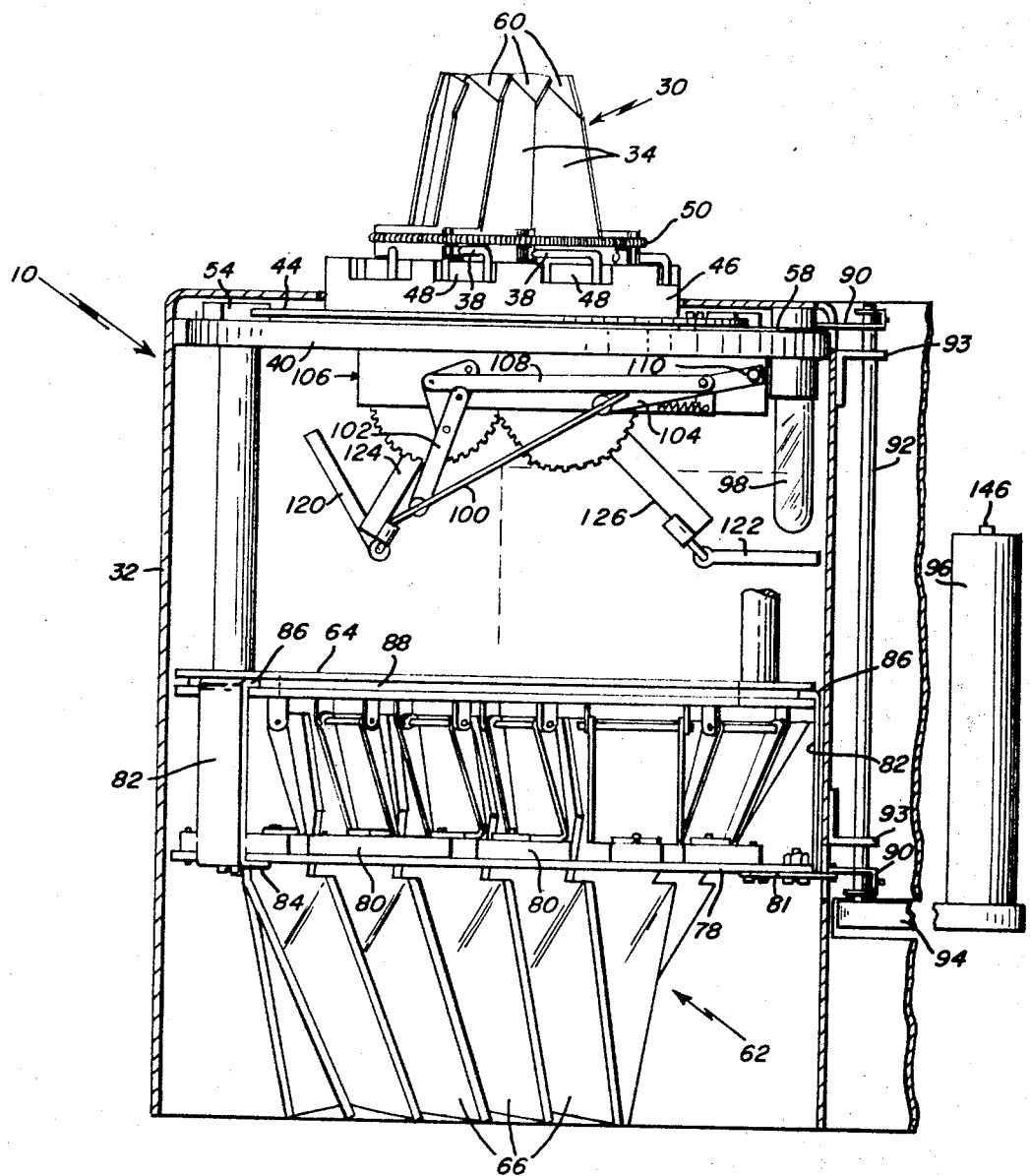
FIG. 2 is a vertical sectional view of a collimator employing a preferred embodiment of the invention.
Figure 4:
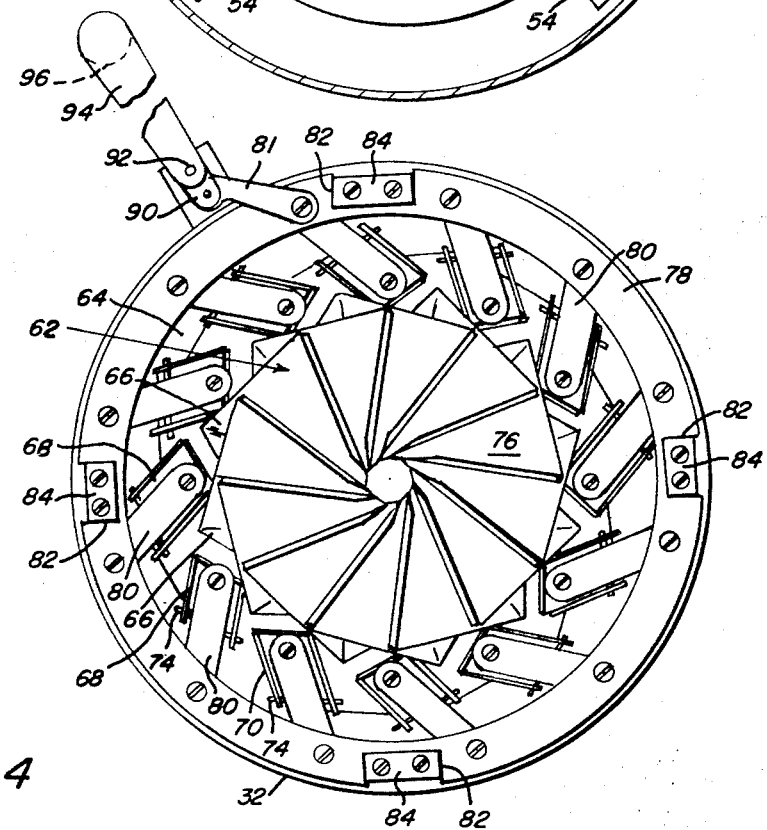
FIG. 4 is a view of the bottom of the collimator of FIG. 2.
Figure 10:
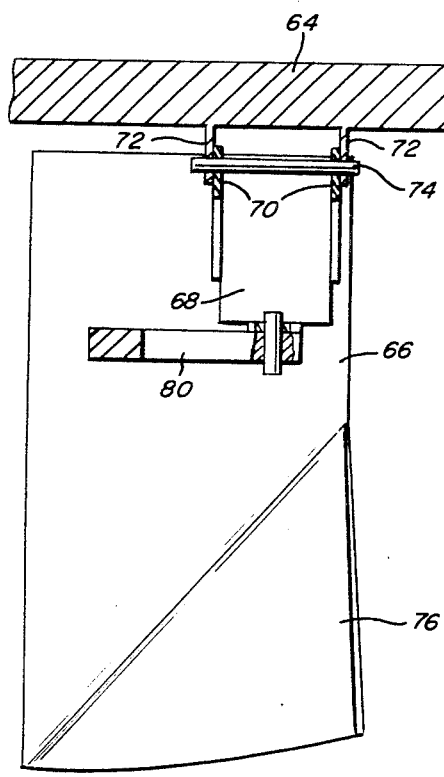
FIG. 10 is a front elevational view of a shutter element of the lower shutter device and its cooperating operating parts.

The transversely extending supporting plate 40 is provided with a central aperture whereby the useful beam of radiation, which beam is shaped as a cone emanating from the focal spot on the anode 24, is permitted to pass into the interior of the collimator 10. It is desired that the beam of X-radiation eventually passing out of the collimator have a selected cross-sectional size whereby the area of X-ray impingement upon a human body or other object will be controlled. For example, it may be desired to irradiate with X-rays only a small portion of an object, while an X-ray beam normally passing through the collimator 10, even with a relatively small aperture at the end of the shutter 30, would irradiate a relatively large portion of the object because of the distance which exists between the shutter aperture and the object. In order to effectively control the size of the irradiated area, a second shutter device 62 is provided in the lower end of the collimator as shown in FIGS. 2 and 4. The second shutter device 62 is substantially larger than shutter 30 and is supported upon a transversely extending annular plate 64. Shutter 62 comprises a number of relatively flat elongated longitudinally extending shutter elements 66 which depend downwardly from the supporting plate 64. The upper ends of the elements 66 are each provided with a respective bracket 68, as shown best in FIGS. 4 and 10. Each bracket 68 is provided with two ears 70 by which the respective leaf or shutter element 66 is attached to lugs 72 on the supporting plate 64. A pivot pin or pintle 74 extending through the lugs 72 and ears 70 permits pivotal movement of the leaf 66 on plate 64. Each pivot structure is angled with respect to the circumferential edge of the plate 64 and to the axis of the device whereby each leaf 66 overlaps an adjacent leaf in the pyramid. Upon pivotal movement of the leaves 66 as a group, the lower ends thereof will move into greater or lesser overlying relation to one another to define an aperture through which X-radiation will be allowed to pass from the collimator. Lower end portions 76 of the leaves are inclined inwardly at a selected angle toward the axis in order to permit substantially complete closure of the aperture.

Simultaneous adjustment of the leaves 66 is accomplished by providing a ring 78 in encircling relation to the pyramid, each leaf being connected to the ring by links 80. The ring 78 is supported from and adjustably connected to the supporting plate 64 by a plurality of U-shaped slides 82 (FIGS. 2 and 4), the lower arm portion 84 of the slides being fixedly connected to ring 78 and the upper arm portions 86 thereof slidably engaging a slot 88 formed throughout the peripheral edge of the plate 64. Pivotally connected to the ring 78 is a lever 81 which extends substantially parallel with lever 58 which is connected to the upper shutter device 30. Thus, by manual manipulation of lever 81, rotary movement of ring 78 is effected about the axis of the system, and through links 80 the respective leaves 66 are moved about their respective pivots whereby the dimension of the aperture in the pyramid is regulated.

It is desirable that both shutter devices be operated simultaneously and that the aperture in the lower shutter be of a size proportionate to that of the aperture in the upper shutter. Accordingly, both levers 58 and 81 are adapted to be manipulated simultaneously. This is accomplished by providing each lever with a respective U-shaped link 90 at the outer ends thereof, which links 90 are pivotally attached at their inner ends to respective levers and are attached at their outer ends to an interconnecting bar or rod 92, as shown in FIG. 2. Set screws or other connecting means inserted through the bight portions of the links and engaging the rod 92 function to maintain the rod in place in the links 90. Rod 92 is adapted to rotate about its longitudinal axis in fixed brackets 93. The lower end of the rod 92 is connected by arm 94 extending exteriorly of the casing 32, arm 94 carrying at its outer end an upright handle or grip 96 by which an operator can effect adjustment of the two shutters 30 and 62 simultaneously.

In the use of a device of the character described, it is desirable that some means be provided for indicating to an operator the actual area of the object which is to be irradiated. Many times this is accomplished by means of an optical system whereby a beam of light will be used to illuminate the area which is to be bombarded with X-rays. In the present invention, there is provided a light source 98 (FIG. 2) which is suitably mounted inside the casing 32 and which directs illumination upon a mirror 100 disposed on the axis of the system at a suitable angle whereby light from the source 98 will be reflected by the mirror 100 outwardly through the second or lower shutter device 62. The mirror is carried by a pair of pivoted levers or arms 102 and 104 which are attached to a suitable frame 106 mounted beneath upper shutter 30. An operating arm 108 interconnects arms 102 and 104 intermediate their ends so that they can be moved simultaneously. Arm 104 is pivotally mounted to the frame by a rod 110 having one end which extends exteriorly of the casing through an opening therein and which has mounted on its outer end a knob 112 (FIG. 1) by which an operator is enabled to rotate rod 110 to move arms 104 and 102 and to thereby swing the mirror into and out of the position shown in FIG. 2. It will be apparent that in certain instances it is undesirable to operate the device with the mirror in place. Therefore, in such cases after the mirror has accomplished its objective of directing light outwardly through the aperture in the lower shutter 62, and the shutters have been manipulated so that the illuminated area has been adjusted to the desired size, the mirror may be swung off the axis of the system so that the X-rays passing through the upper shutter 30 will not be intercepted.

Figure 5:
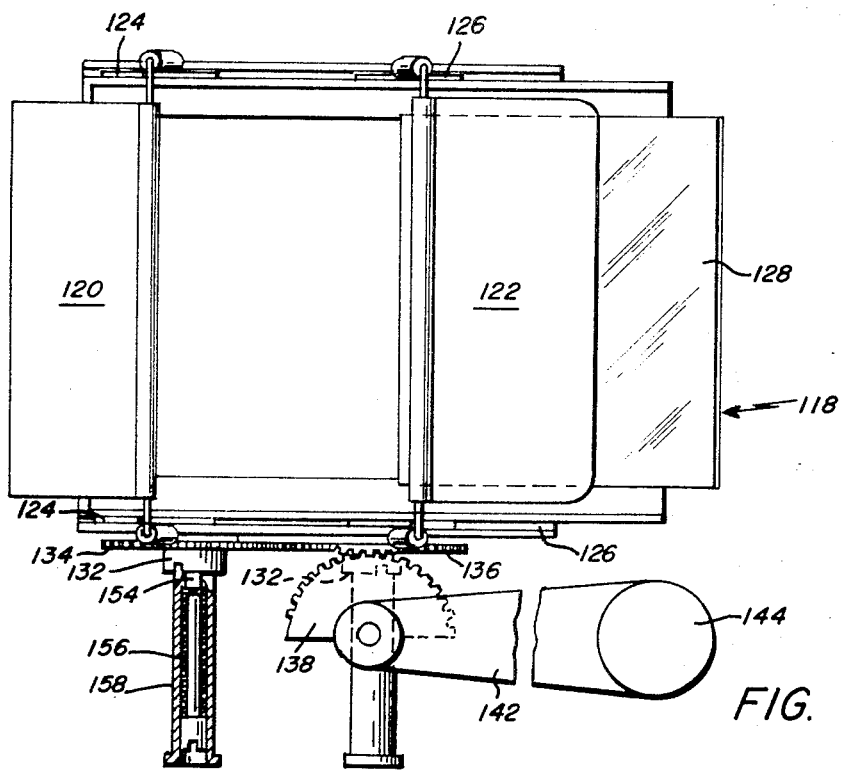
FIG. 5 is a bottom elevational view of the third shutter system employed in the collimator of FIG. 2.
Figure 6:
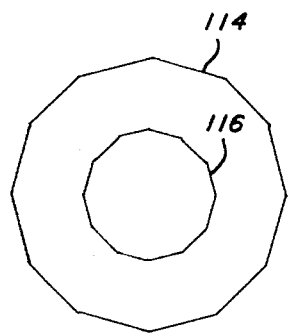
FIGS. 6, 7 and 8 are diagrammatic illustrations showing various configurations of areas of an object being illuminated or irradiated.
Figure 7:
Figure 8:
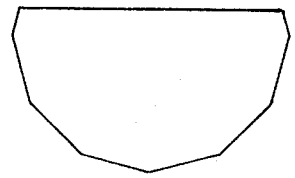

With the system as above described, it will be apparent that with the shutters 30 and 62 open to their widest extent a relatively large area of an object will be irradiated by X-rays passing through the device. For example, FIG. 6 indicates diagrammatically by the line 114 a relatively large area of irradiation. This area will correspond to the area which is illuminated by source 98. If the shutters are partially closed, the area of illumination and irradiation may be reduced to that indicated by numeral 116, for example. In many cases, it is desirable that the area of irradiation or illumination not comprise a circular configuration such as shown in FIGS. 7 and 8, for example. Such additional control of the shape of the illuminated and irradiated area is achieved by a third shutter system which is shown in FIGS. 2 and 5. The third shutter system 118 comprises two rectangular shutter elements or plates 120 and 122 which depend from arms 124 and 126 connected at their upper ends to a suitable frame 128 which may be designed, if desired, to contain the frame 106 for the mirror 100. The arms 124 and 126 are fixedly connected to the inner ends of hubs 130 and 132 respectively, to which hubs are affixed gears 134 and 136 respectively. Gears 134–136 are adapted to mesh with one another. A third gear 138 is disposed in a plane normal to one of the two first-mentioned gears and is in mesh therewith as shown in FIG. 5. Gear 138 is suitably affixed to a shaft 140, which shaft is connected at its lower end to an operting arm 142 extending exteriorly of the casing 32. Arm 142 carries at its outer end a grip or handle 144 similar to handle 96. By means of handle 144, an operator can rotate gear 138, which in turn effects rotation of gears 136 and 134. By this means, the arms 124 and 126 can be moved about their pivots to swing the shutter elements 120 and 122 toward and away from one another. It will be apparent that when the plates 120–122 abut one another, this will block the beam of X-rays traveling from upper shutter device 30 to lower shutter device 62, and that when the plates or elements 120–122 are spread apart, the beam of X-rays will readily pass therethrough without interception.

However, it is often desirable, as pointed out above, that an irregularly shaped beam of X-rays be provided. For example, it may be desirable to provide a beam having a shape such as shown in FIG. 7. In such a case, one of the shutter elements 120 or 122 is moved out of intercepting relation with the X-ray beam while the other element remains in position to intercept a portion of the X-rays. This is achieved in the present device by the provision of a clutch 150 or 152 (FIG. 5) attached to the respective shutter element whereby when a clutch is disengaged, the particular shutter element to which it is attached will be prevented from being moved out of the X-ray beam. Each shutter is provided with a rotary shaft (not shown) on the respective arm 124 or 126, which shaft extends freely into the hub 132 and engages with a dog 154. Dog 154 is yieldably urged into engagement with the shaft by a spring mechanism 156 contained within a sleeve 158 which has its inner end normally seated in a notch in hub 132. The other end of the sleeve 158 extends exteriorly of the casing. To disengage a shutter and prevent its movement, it is merely necessary for an operator to pull sleeve 158 outwardly to disengage it from hub 132 and to disengage the dog 154 from its shaft. This permits the hub and gear to rotate without moving the shutter.

It will be apparent that either or both shutters 120 and 122 may be positioned so as to intercept only a portion of the X-ray beam to the extent desired.

Referring again to the source of illumination 98, any suitable means may be provided for turning the source on and off. In the present instance, we have provided thumb switches 146 and 148 in the ends of the handles 96 and 144 respectively. These switches are not shown in detail in the drawings since they are conventional and may be of any suitable type with operating elements such as push buttons readily available to the operator of the device. The switches and light source may be electrically interconnected by any suitable conventional means, and the light source likewise may be connected to a source of electrical potential external to the device as required.

It will be apparent that with a device having controls and handles as described herein, an operator may easily position the X-ray tube and collimator, as well as the equipment to which the X-ray tube is attached, by grasping the handles 96 and 144 and positioning the equipment with relation to a patient as is desired. Normally, this is awkward and sometimes difficult with conventionally designed equipment.

It will be apparent that all of the objectives of the present invention are achieved in the invention described herein. However, modifications and changes in the structure may be made by those skilled in the art without departing from the spirit of the invention as expressed in the accompanying claims.

I claim:

1. A penetrative radiation collimator comprising a hollow casing containing at one end a shutter device embodying a plurality of longitudinally extending leaves of radiation adsorbing material, each leaf being pivotally mounted at one end within the casing and having a portion of its opposite end extending outwardly beyond the casing, the leaves being movable about their respective pivots into close overlying relation to effectively define a hollow cone with the extent of such movement determining the size of an aperture defined by the free ends of said leaves whereby a beam of penetrative radiation directed toward the small end of the cone will be intercepted and absorbed by said leaves except for the portion thereof which enters said aperture, the shutter device being coaxially aligned with the axis of the casing and the small end of the cone defined by the overlapping leaves extending outwardly of the casing, the free end of each leaf being provided with an inwardly angled portion, said angled portions being located in adjacent relationship to substantially completely block passage of radiation through the shutter device when the leaves are adjusted to maximum closed position.

2. A penetrative radiation collimator comprising a hollow casing for passage of a beam of radiation therethrough along a predetermined axis, said casing containing a pair of separate axially spaced shutter devices coaxially aligned on said axis one at each end of the casing, each shutter device being comprised of a hollow frusto-conical arrangement of longitudinally extending leaves of radiation absorbing material, each leaf being pivotally supported at the large end of the respective cone and being movable about its respective pivot into close overlying relation with adjacent leaves and at an angle with respect to the axis of said beam of radiation, the shutters being means for effectively regulating the size of an aperture defined by the free ends of said leaves in each device, the first of said shutter devices being of a size to intercept areas of a divergent beam of radiation relatively close to the source thereof, and the second device being of a size to control the cross-sectional dimension of the beam passing through the aperture in the first device in a plane more remote from the source of the radiation.

3. A collimator as set forth in claim 2 wherein the unsupported ends of the leaves of the first shutter device extend outwardly beyond the casing.

4. A collimator as set forth in claim 3 wherein the shutter devices are mounted within the casing with the larger ends of the cones formed thereby being directed toward one another.

5. A collimator as set forth in claim 2 wherein the leaves of the respective shutters are planar elements angled slightly with respect to one another to facilitate movement into overlapping relation, and wherein the unsupported ends of the leaves have portions angled to a greater extent than the major portions thereof whereby substantially complete blocking of radiation is achieved.

6. A collimator as set forth in claim 2 wherein a third shutter device is mounted in the casing between said first and second shutter devices, said third shutter device comprising a plurality of plate-like shutter elements movable toward and away from one another in a plane normal to said axis.

7. A collimator as set forth in claim 6 wherein means is provided for individually moving the shutter elements of said third shutter device and for thus intercepting selected portions of the beam of radiation passing through said first and second shutter devices.

8. A collimator as set forth in claim 6 wherein a first handle is provided externally of the casing, mechanical linkage connecting said handle to said first and second shutter devices for simultaneous manual operation thereof, and a second handle is provided exteriorly of said casing, and mechanical linkage connecting said second handle with said third shutter device for operation of said third shutter device independently of said first and second shutter devices.

9. A collimator as set forth in claim 8 wherein illuminating means is mounted within the casing for directing a beam of light outwardly of the casing through said second shutter device to illuminate an object in an area controlled by the size of the aperture defined by the unsupported ends of the elements of said second shutter, and switch means in at least one of said handles and connecting said illuminating means to an external electrical source.

10. A collimator as set forth in claim 2 which includes an optical light-transmitting system, said system embodying a source of light mounted within the casing, a mirror of radiation-transmitting material positioned within the casing on said axis and in a position to receive a beam of light from said source and for reflecting said beam of light through said second shutter device onto an object for illuminating said object in the area to be irradiated by radiation passing through said shutter devices.

11. A collimator as set forth in claim 10 wherein said mirror is movable into and out of the beam of radiation.

References Cited

UNITED STATES PATENTS 3,127,514  3/1964  Sharp et al. _____ 250—105
3,156,824  11/1964 Peyser et al. _____ 250—105

FOREIGN PATENTS 319,940  10/1929  Great Britain.

ARCHIE R. BORCHELT, *Primary Examiner.*

A. L. BIRCH, *Assistant Examiner.*